United States Patent
Mritunjai et al.

(10) Patent No.: US 11,809,404 B1
(45) Date of Patent: Nov. 7, 2023

(54) MIXED-MODE REPLICATION FOR SHARDED DATABASE SYSTEMS

(71) Applicant: Amazon Technologies, Inc., Seattle, WA (US)

(72) Inventors: Akhilesh Mritunjai, Seattle, WA (US); Akshat Vig, Seattle, WA (US); Craig Wesley Howard, Seattle, WA (US); Hao He, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 68 days.

(21) Appl. No.: 17/038,544

(22) Filed: Sep. 30, 2020

(51) Int. Cl.
*G06F 16/23* (2019.01)
*H04L 67/1021* (2022.01)
*G06F 16/27* (2019.01)

(52) U.S. Cl.
CPC ...... *G06F 16/2365* (2019.01); *G06F 16/2358* (2019.01); *G06F 16/278* (2019.01); *H04L 67/1021* (2013.01)

(58) Field of Classification Search
CPC .............. G06F 16/2365; G06F 16/278; G06F 16/2358; H04L 67/1021
See application file for complete search history.

(56) References Cited

U.S. PATENT DOCUMENTS

| | | | | |
|---|---|---|---|---|
| 9,813,509 B1* | 11/2017 | Visser | ...................... | G06F 9/547 |
| 9,922,086 B1* | 3/2018 | Huang | ................ | G06F 16/2379 |
| 2009/0193122 A1* | 7/2009 | Krishamurthy | ........ | G06F 9/5088 |
| | | | | 709/226 |
| 2013/0290249 A1* | 10/2013 | Merriman | ............. | G06F 16/278 |
| | | | | 707/610 |
| 2016/0344751 A1* | 11/2016 | Leach | .................... | H04L 67/535 |
| 2018/0181330 A1* | 6/2018 | Kusters | ................. | G06F 3/0619 |
| 2019/0340168 A1* | 11/2019 | Raman | ................ | H04L 41/5022 |
| 2019/0394284 A1* | 12/2019 | Baghel | .................... | H04L 67/42 |
| 2020/0007457 A1* | 1/2020 | Greenstein | .......... | H04L 41/0813 |

\* cited by examiner

*Primary Examiner* — Tamara T Kyle
*Assistant Examiner* — Lahcen Ennaji
(74) *Attorney, Agent, or Firm* — Nicholson De Vos Webster & Elliott LLP

(57) ABSTRACT

Techniques are described for enabling a database service to provide a zonal consistency model for read and write operations involving database tables replicated across a plurality of availability zones of a cloud provider network according to some embodiments. A database service routes zonally consistent operations to request routers and storage nodes that are located in a same availability zone as the client device from which the request originates. For example, in contrast to standard write operations and strongly consistent read operations, which are processed by a leader storage node that may be located in a different availability zone than the originating request, zonally consistent operations can be processed by any storage node and, in particular, by a storage node in a same availability zone as the originating client device.

14 Claims, 10 Drawing Sheets

MIXED-MODE REPLICATION FOR SHARDED DATABASE SYSTEMS

BACKGROUND

Cloud computing platforms provide on-demand, managed computing resources to customers. The types of computing resources provided by such platforms typically include databases, including both relational databases and non-relational databases (e.g., NoSQL key-value and document databases). To provide high availability and data durability for users' databases, a cloud computing platform often spreads the data and traffic for users' tables across multiple availability zones within regions defined by the cloud computing platform.

BRIEF DESCRIPTION OF DRAWINGS

Various embodiments in accordance with the present disclosure will be described with reference to the drawings, in which.

DETAILED DESCRIPTION

Figure 1:
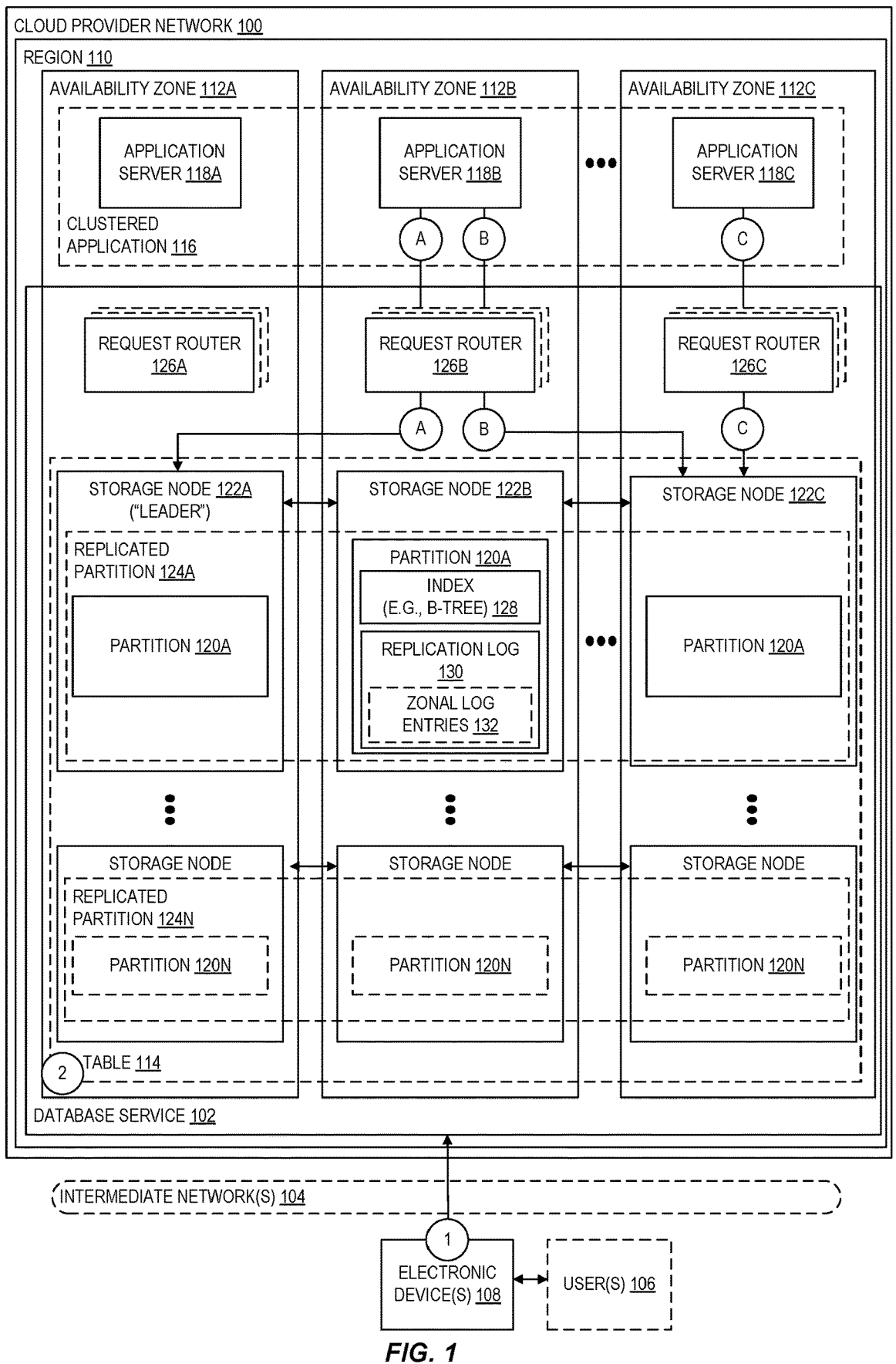
FIG. 1 is a diagram illustrating a database service that provides provide a zonal consistency model for read and write operations associated with database tables replicated across a plurality of availability zones of a cloud provider network according to some embodiments.

The present disclosure relates to methods, apparatus, systems, and non-transitory computer-readable storage media for enabling a database service to provide a zonal consistency model for read and write operations involving database tables replicated across a plurality of availability zones of a cloud provider network according to some embodiments. In some embodiments, a database service (e.g., a NoSQL key-value and document database service) provides various consistency models for read and write operations, including "eventually consistent" and "strongly consistent" models. Eventual consistency maximizes read throughput, although an eventually consistent read might not reflect the results of a recently completed write. Strongly consistent reads return a result that reflects all writes that received a successful response before the read with a latency tradeoff. According to embodiments described herein, a database service further provides a "zonal" consistency model for database operations involving a database table that is replicated across multiple availability zones of a cloud provider region. According to embodiments described herein, a database service routes zonally consistent operations to request routers and storage nodes that are located in a same availability zone as the client device from which the request originates. For example, in contrast to standard write operations and strongly consistent read operations, which are processed by a leader storage node that may be located in a different availability zone than the originating request, zonally consistent operations can be processed by any storage node and, in particular, by a storage node in a same availability zone as the originating client device. Among other benefits, the use of zonally consistent database operations enables users to optimize performance of applications accessing a database table having a replicated copy within a same availability zone by avoiding cross-availability zone latency often associated with consistent and eventually consistent operations. Furthermore, the ability for a database service to provide a zonally consistent model as described herein can be implemented using an existing replication model provided by a database service, e.g., without requiring additional replicated copies of a database's partitions.

Some cloud service providers provide a NoSQL key-value and document database service, sometimes also referred to as a non-relational database service, a NoSQL database service, or simply a database service. NoSQL database systems, for example, use alternative models for data management compared to traditional relational database systems, such as key-value pairs or document storage. The core components of a typical key-value and document database service include tables, items, and attributes, where a table is a collection of items and each item is a collection of attributes. A key-value and document database service typically uses primary keys to uniquely identify each item in a table and secondary indexes to provide more querying flexibility, among many other features.

In some embodiments, a key-value and document database service provides databases to users using a partitioned (or "sharded") database architecture. In this context, a partition is an allocation of storage for a table, backed by a physical storage device (e.g., solid-state drives) and automatically replicated across multiple availability zones within a region of the cloud provider network. In some embodiments, the consistency among replicas within a region during updates is maintained using quorum-based techniques and decentralized replica synchronization (e.g., using Paxos or other consensus algorithms), where one storage node of a plurality of storage nodes storing a given partition is elected as the "leader" storage node at any given time and is definitionally up-to-date in terms of updates to the partition. The leader storage node for a given partition could be in any of the availability zones storing a copy of the partition, while user requests involving data items stored in the partition can originate in any availability zone (or from outside of any particular availability zone). In some cases, to satisfy requests originating from client devices located in an availability zone that is different from the availability zone containing the leader storage node, additional network latency overhead is incurred as the operation request and replication requests cross availability zone boundaries at least once.

According to embodiments described herein, a database service provides a mixed-mode replication protocol that enables reads and write operations to be optionally served locally within an availability zone (e.g., using a first time-stamped-based replication protocol to maintain consistency across zonal table replicas), while maintaining the durability and availability guarantees currently provided (e.g., using a second consensus-based replication protocol). For example, in some embodiments, requests including a specification of a zonal consistency model are directed to request routers and storage nodes in a same availability zone (or a closest availability zone) as that in which the client device originating the request is located, thereby improving the latency of such requests by avoiding cross-availability zone traffic. In some embodiments, consistency and conflict resolution for requests specifying a zonal consistency model use "last writer wins" or similar reconciliation techniques based on timestamps associated with zonal log entries generated by the storage nodes receiving the requests.

FIG. 1 is a diagram illustrating the zonal consistency mode for a NoSQL database service 102 of a provider network 100. A provider network 100 (or "cloud" provider network) provides users with the ability to utilize one or more of a variety of types of computing-related resources such as compute resources (e.g., executing virtual machine (VM) instances and/or containers, executing batch jobs, executing code without provisioning servers), data/storage resources (e.g., object storage, block-level storage, data archival storage, databases and database tables, etc.), network-related resources (e.g., configuring virtual networks including groups of compute resources, content delivery networks (CDNs), Domain Name Service (DNS)), application resources (e.g., databases, application build/deployment services), access policies or roles, identity policies or roles, machine images, routers and other data processing resources, etc. These and other computing resources may be provided as services, such as a hardware virtualization service that can execute compute instances, a storage service that can store data objects, etc. The users (or "customers") of provider networks 100 may utilize one or more user accounts that are associated with a customer account, though these terms may be used somewhat interchangeably depending upon the context of use. Users (e.g., user(s) 106) may interact with a provider network 100 using electronic devices (e.g., electronic device(s) 108) across one or more intermediate networks 104 (e.g., the internet) via one or more interface(s), such as through use of application programming interface (API) calls, via a console implemented as a website or application, etc. An API refers to an interface and/or communication protocol between a client and a server, such that if the client makes a request in a predefined format, the client should receive a response in a specific format or initiate a defined action. In the cloud provider network context, APIs provide a gateway for customers to access cloud infrastructure by allowing customers to obtain data from or cause actions within the cloud provider network, enabling the development of applications that interact with resources and services hosted in the cloud provider network. APIs can also enable different services of the cloud provider network to exchange data with one another. The interface(s) may be part of, or serve as a front-end to, a control plane of the provider network 100 that includes "backend" services supporting and enabling the services that may be more directly offered to customers.

For example, a cloud provider network 100 (or just "cloud") typically refers to a large pool of accessible virtualized computing resources (such as compute, storage, and networking resources, applications, and services). A cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

A cloud provider network can be formed as a number of regions, where a region (e.g., region 110) is a geographical area in which the cloud provider clusters data centers. Each region includes multiple (e.g., two or more) availability zones (AZs) connected to one another via a private high-speed network, for example a fiber communication connection. An AZ (also known as an availability domain, or simply a "zone") provides an isolated failure domain including one or more data center facilities with separate power, separate networking, and separate cooling from those in another AZ. A data center refers to a physical building or enclosure that houses and provides power and cooling to servers of the cloud provider network. Preferably, AZs within a region are positioned far enough away from one another so that a natural disaster (or other failure-inducing event) should not affect or take more than one AZ offline at the same time. FIG. 1, for example, includes an AZ 112A, AZ 112B, and AZ 112C, which may be part of a same region 110 of the cloud provider network 100. The region including AZ 112A, AZ 112B, and AZ 112C may further include one or more additional AZs, and the provider network 100 may further include any number of additional regions.

Customers can connect to resources in an AZ of the cloud provider network via a publicly accessible network 104 (e.g., the Internet, a cellular communication network), e.g., by way of a transit center (TC). TCs are the primary backbone locations linking customers to the cloud provider network and may be collocated at other network provider facilities (e.g., Internet service providers (ISPs), telecommunications providers) and securely connected (e.g., via a VPN or direct connection) to the AZs. Each region can operate two or more TCs for redundancy. Regions are connected to a global network which includes private networking infrastructure (e.g., fiber connections controlled by the cloud provider) connecting each region to at least one other region. The cloud provider network may deliver content from points of presence (or "POPs") outside of, but networked with, these regions by way of edge locations and regional edge cache servers. This compartmentalization and geographic distribution of computing hardware enables the cloud provider network to provide low-latency resource access to customers on a global scale with a high degree of fault tolerance and stability.

Generally, the traffic and operations of a provider network 100 may broadly be subdivided into two categories: control plane operations carried over a logical control plane and data plane operations carried over a logical data plane. While the data plane represents the movement of user data through the distributed computing system, the control plane represents the movement of control signals through the distributed computing system. The control plane generally includes one or more control plane components distributed across and implemented by one or more control servers. Control plane traffic generally includes administrative operations, such as system configuration and management (e.g., resource placement, hardware capacity management, diagnostic monitoring, system state information). The data plane includes customer resources that are implemented on the provider network (e.g., computing instances, containers, block storage volumes, databases, file storage). Data plane traffic generally includes non-administrative operations such as transferring customer data to and from the customer resources. The control plane components are typically implemented on a separate set of servers from the data plane servers, and control plane traffic and data plane traffic may be sent over separate/distinct networks.

To provide these and other computing resource services, provider networks 100 often rely upon virtualization techniques. For example, virtualization technologies may be used to provide users the ability to control or utilize compute resources (e.g., a "compute instance" such as a VM using a guest operating system (O/S) that operates using a hypervisor that may or may not further operate on top of an underlying host O/S, a container that may or may not operate in a VM, a compute instance that can execute on "bare metal" hardware without an underlying hypervisor), where one or multiple compute resources can be implemented using a single electronic device. Thus, a user may directly utilize a compute resource (e.g., provided by a hardware virtualization service) hosted by the provider network to perform a variety of computing tasks. Additionally, or alternatively, a user may indirectly utilize a compute resource by submitting code to be executed by the provider network (e.g., via an on-demand code execution service), which in turn utilizes one or more compute resources to execute the code—typically without the user having any control of or knowledge of the underlying compute instance(s) involved.

In some embodiments, a cloud provider network 100 includes a NoSQL key-value and document database service 102 (referred to in various implementations as a NoSQL database service or simply database service 102). A database service 102 provides a managed, multi-region, multi-master, durable database service with built-in security, backup and restore, and in-memory caching for internet-scale applications, among other features. In some embodiments, at circle "1" in FIG. 1, a user 106 uses an electronic device 108 to create a table 114 (e.g., a data structure used to store data items) using the database service 102. Communications between the electronic device 108 and the provider network 100, such as the request to create a new table 114, can be routed through interfaces, such as through use of application programming interface (API) calls, via a console implemented as a website or application, and so forth. In addition to serving as a frontend to control plane services, the interfaces can perform operations such as verifying the identity and permissions of the user initiating a request, evaluating the request and routing it to the appropriate control plane services, and so forth. In some embodiments, to create a table 112, a user generates a request specifying some or all of: a name of the table 114, a key schema (e.g., attributes to be used as a primary key for the table 114), and data types of key schema attributes; otherwise, the table generally may be schemaless. In other embodiments, other types of database services, databases architectures, and database tables can be used (e.g., relational databases and relational database tables).

In some embodiments, the database service 102 is available in multiple regions around the world, including an example region 110 in FIG. 1. As indicated above, each region generally is independent and isolated from other regions of the cloud provider network 100 and further consists of multiple distinct locations referred to herein as availability zones (or AZs). In the example of FIG. 1, the table 114 may be designed for use by a clustered application 116 (e.g., to store, retrieve, modify, and delete data items as part of the application's operation), the implementation of which may similarly be distributed across any number of separate availability zones for resiliency and redundancy purposes. For example, in FIG. 1, the clustered application 116 includes an application server 118A, application server 118B, and application server 118C in each of availability zones 112A-112C. In other examples, a clustered application may include applications servers in more or fewer availability zones depending on the application developers' preferences.

In some embodiments, at circle "2," the database service 102 creates the requested table 114 and, over time (e.g., responsive to requests from the clustered application 116 to store data in the table), stores data in the table in one or more partitions (or shards). A partition is an allocation of storage for a table and, in some embodiments, the database service 102 automatically replicates each partition across multiple availability zones within a region of the cloud provider network 100. For example, in FIG. 1, the table 114 is partitioned into one or more partitions (e.g., partition 120A, . . . , partition 120N) each of which may be stored at a storage node within each availability zone (and possibly across multiple storage nodes). Furthermore, in this example, each partition is replicated three times across three distinct availability zones (e.g., partition 120A is replicated at each of a storage node 122A in availability zone 112A, at storage node 122B in availability zone 112B, and at storage node 122C in an availability zone 112C), represented by replicated partition 124A and replicated partition 124N. In some embodiments, the management and replication of partitions is managed by the database service 102 and without the need for user involvement, although in some embodiments users may configure preferences related to the amount of redundancy desired, the selection of availability zones in which to replicate partitions, etc.

As indicated above, a table 114 generally is a collection of data items, where each data item is a collection of attributes. In some embodiments, the database service 102 uses primary keys to uniquely identify each item in a table and, optionally, secondary indexes to provide more querying flexibility. In some embodiments, the database service 102 uses the value of the defined partition key as input to an internal hash function, where the output from the hash function determines the partition in which the item is to be stored (e.g., based on a physical storage device storing the partition). Other types of partitioning schemes may be used in other embodiments. Each partition further includes two data structures: a B-tree used to locate items (e.g., represented by the index 128 in the partition 120A stored on storage node 122B), and a replication log 130 that records all changes (or mutations) made to the data stored in a partition. The service 102 may periodically take snapshots of these two data structures and store the snapshots in a separate data storage service (not shown in FIG. 1).

The example shown in FIG. 1 illustrates a type of table that may be referred to as a "regional" or "local" table due to the table's storage and replication being contained within a single region of the cloud provider network 100. In some embodiments, a database service 102 further enables users to configure cross-regional or "global" tables. A global table is a collection of one or more replica tables, all owned by a single cloud provider network user or account. A replica table (or replica, for short) is a single database service 102 table that functions as part of a global table, where each replica stores the same set of data items. When a user creates a global table, it consists of multiple replica tables (one per region) that the database service 102 treats as a single unit (e.g., each replica table has the same table name and same primary key schema). When an application writes data to a replica table in one region, the database service 102 propagates the write to other replica tables in the other cloud provider network 100 regions automatically.

In some embodiments, if applications update the same data item in different regions of a global table at about the same time, conflicts can arise. To help ensure eventual consistency, in some embodiments, a database service 102 providing global tables use a "last writer wins" reconciliation between concurrent updates (e.g., based on timestamps associated with each of the write operations in respective regions). With this conflict resolution mechanism, all replicas will agree on the latest update and converge toward a state in which they all have identical data.

In some embodiments, users or applications can make requests to read and write data items stored or to be stored in a database table 114. In the example, of FIG. 1, the clustered application 116 may periodically generate requests to read, insert, update, or delete one or more data items stored in the table 114. For example, at circle "A" in FIG. 1, an application server 118B requests to insert, update, or delete one or more data items stored in the table 114 and, in some embodiments, the request is received by the database service 102 and directed to a request router (e.g., one of request routers 126A-126C). Responsive to receiving an example request "A" in FIG. 1, a request router 126B processes the request by initially authenticating and authorizing the request. In some embodiments, the authentication and authorization of a request involves interacting with a separate identity and access management service of the cloud provider network 100 (not illustrated) or using any other internal or external authentication and authorization subsystems.

Once a request is authenticated and authorized, the request router 126B directs the request to one of the storage nodes storing the partition involved in the request. In some embodiments, a standard write operation is directed to a "leader" storage node (e.g., storage node 122A in the example of FIG. 1). As indicated above, in some embodiments, a database service 102 uses leader election and consensus protocols (e.g., including Paxos-based protocols) to elect a leader storage node for each partition and more generally to ensure eventual consistency of data items across the partitions. In some embodiments, the leader storage node 122A processes the write operation by performing the requested mutation locally (e.g., including recording the mutation to its local replication log) and propagates the mutation to each of the peer storage nodes. In some embodiments, once the leader storage node receives an indication from at least one of the peer storage nodes acknowledging the write operation (e.g., indicating that the peer storage node has also persisted the write operation), the leader storage node then sends an acknowledgment message back to the request router 126B, which in turn sends back an acknowledgement to the requesting client device 118B. As shown, a standard write operation can involve several cross-availability zone requests before an acknowledgment is sent back to the requesting device, including cross-availability zone requests between the request router 126B and the leader storage node 122A and between the leader storage node 122A and the peer storage nodes 122B and 122C.

In some embodiments, circle "B" in FIG. 1 illustrates the processing of a standard read operation. As indicated above, in some embodiments, a database service 102 supports two or more consistency models for read requests including, for example, eventually consistent reads and strongly consistent reads. In some embodiments, a request router 126B processing an eventually consistent read randomly chooses any one of the three storage nodes hosting the relevant partition to perform the read (e.g., to distribute the traffic over the storage nodes 122A-122C). When performing an eventually consistent read, the response might not reflect the results of a recently completed write operation, e.g., because the randomly selected storage node has not yet persisted a write operation performed by the leader storage node. In some embodiments, a strongly consistent read is instead directed to the leader storage node so that a response is guaranteed to have the most up-to-date data reflecting the updates from all prior write operations (which are also directed to the leader storage node), although such an operation may be associated with higher latency compared eventually consistent reads.

According to embodiments described herein, an additional consistency model is provided referred to herein as a "zonal" consistency model. As indicated above, for each partition of a database table 114, one of the three nodes storing a replica of the partition is designated the leader storage node. As illustrated above with respect to processing write operations "A" and read operations "B," write operations first travel through the leader node before propagating to the other peer storage nodes and read operations are either randomly directed to storage nodes or to the leader storage node for strongly consistent reads. In some embodiments, a read or write operation specifying a zonal consistency model is instead directed to a request router and storage node in a same availability zone as a computing device from which the request originates regardless of the status of the leader status of the "local" storage node.

In FIG. 1, the request labeled with circle "C" illustrates a zonally consistent read or write operation generated by a client device (e.g., an application server 118C) in an availability zone 112C. The request, for example, can be a write operation (e.g., a request to "put" a data item into the table, to "update" an item already in the table, or to "delete" an item in the table) or a read operation (e.g., a request to "get" an item in the table). In some embodiments, the request specifies that the request is a zonal consistency model request (e.g., using a CLI command such as "csp dbservice get-item—zonal-read—table-name ExampleTable—key . . . ", using a similar API request, or using a web-based console).

In some embodiments, the zonal consistency model request "C" is directed by the database service 102 to a request router 126C in the same availability zone 112C as the requesting application server 118C. In some embodiments, a zonal consistency model request is directed by the database service 102 to a request router in a same availability zone as the requesting device based on information contained in the request (e.g., an identifier of an IP address, availability zone identifier, or other indication of the requesting computing device's location) or using other external information known about the requesting device. In some embodiments, the request router 126C receiving the request "C" authenticates and authorizes the request and, if the request is successfully authenticated and authorized, the request router 126C hashes the partition key identified in the request to identify the partition storing the relevant data item (e.g., one of partitions 120A-120N). As indicated above, for any identified partition, there are two or more nodes storing a replica of that partition's data (e.g., partition 120A is replicated at each of storage nodes 122A-122C in each of availability zones 112A-122C). In the example of FIG. 1, the request "C" specifies a partition key identifying a data item stored in the partition 120A.

Figure 2:
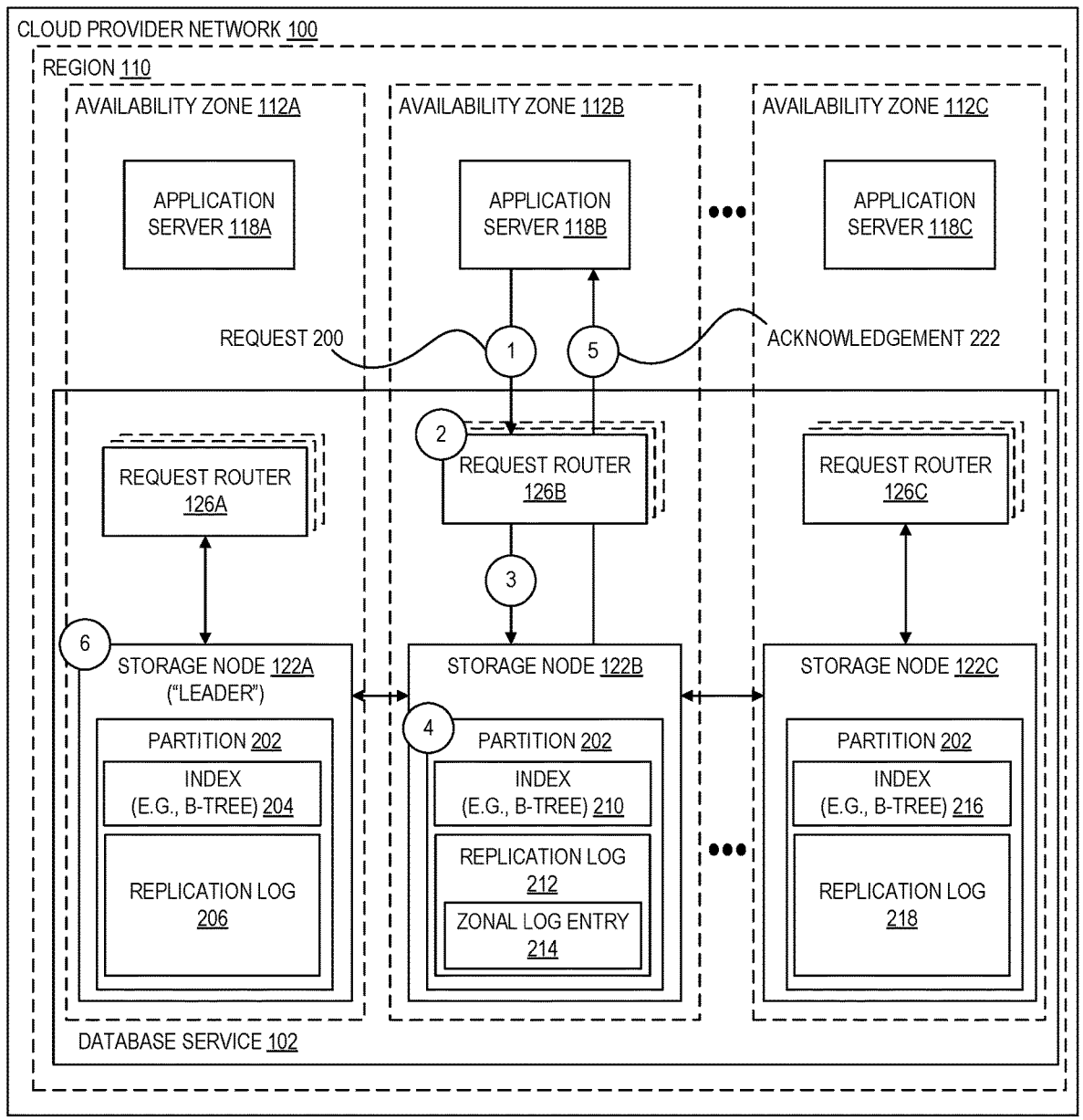
FIG. 2 is a diagram illustrating a database service processing a request specifying a write operation and further specifying a zonal consistency model according to some embodiments.

As shown in FIG. 1, the request router 126C determines that the request specifies a zonal consistency model for the request, e.g., by identifying the flag or other data contained in the request identifying the zonal consistency model. In some embodiments, the request router determines that the request "C" is a zonal consistency model request based on the endpoint accessed by the application server 118C (e.g., specific endpoints may be provided by the database service 102 in each availability zone for zonally consistent requests) instead of a regional endpoint accessed for standard read and write operations. In some embodiments, once the request router 126C determines that the request specifies a zonal consistency model and involves a data item stored in partition 120A, the request router 126C sends the request to storage node 122C in the same availability zone 112C, where the storage node 122C stores a replicated copy of the partition 120A. FIG. 2 further illustrates processes performed by the storage node in the case of receiving a zonally write operation, while FIG. 3 further illustrates processes performed by a storage node in the case of a zonally consistent read operation.

FIG. 2 is a diagram illustrating a database service processing a request to perform a write operation and further specifying a zonal consistency model according to some embodiments. For example, at circle "1" in FIG. 2 an application server 118B generates a request 200 to perform a write operation involving a data item stored in a partition 202 which is replicated across storage nodes 122A-122C. As indicated above, at circle "2," a request router 126B receiving the request authenticates and authorizes the request, determines that the request involves a data item stored in the partition 202, and further determines that the request specifies a zonal consistency model. In some embodiments, responsive to determining that the request specifies a zonal consistency model, at circle "3," the request router 126B sends the request to the storage node 122B, which is located in the same availability zone 112B as the request router 126B and the originating application server 118B.

In some embodiments, at circle "4," a storage node 122B receiving a request specifying a write operation and further specifying a zonal consistency model reads the item identified by the partition key from the index 210, locks the data item in an item table (e.g., an in-memory data structure present on the storage node), and performs the update to the data item according to the request (e.g., including evaluating any conditional expressions, if any). In some embodiments, the storage node 122B further generates a zonal log entry 214 reflecting the performed write operation and including a tuple optionally identifying the availability zone in which the storage node is located (e.g., availability zone 112B) and specifying a local time stamp associated with the write operation. In some embodiments, the zonal log entry 214 can be stored as part of a replication log 212 or in a separate zonal log. In some embodiments, the timestamp included in the zonal log entry 214 is a monotonically increasing physio-logical timestamp, e.g., derived using a storage node's local time in microseconds concatenated with a monotonic counter.

Figure 5:
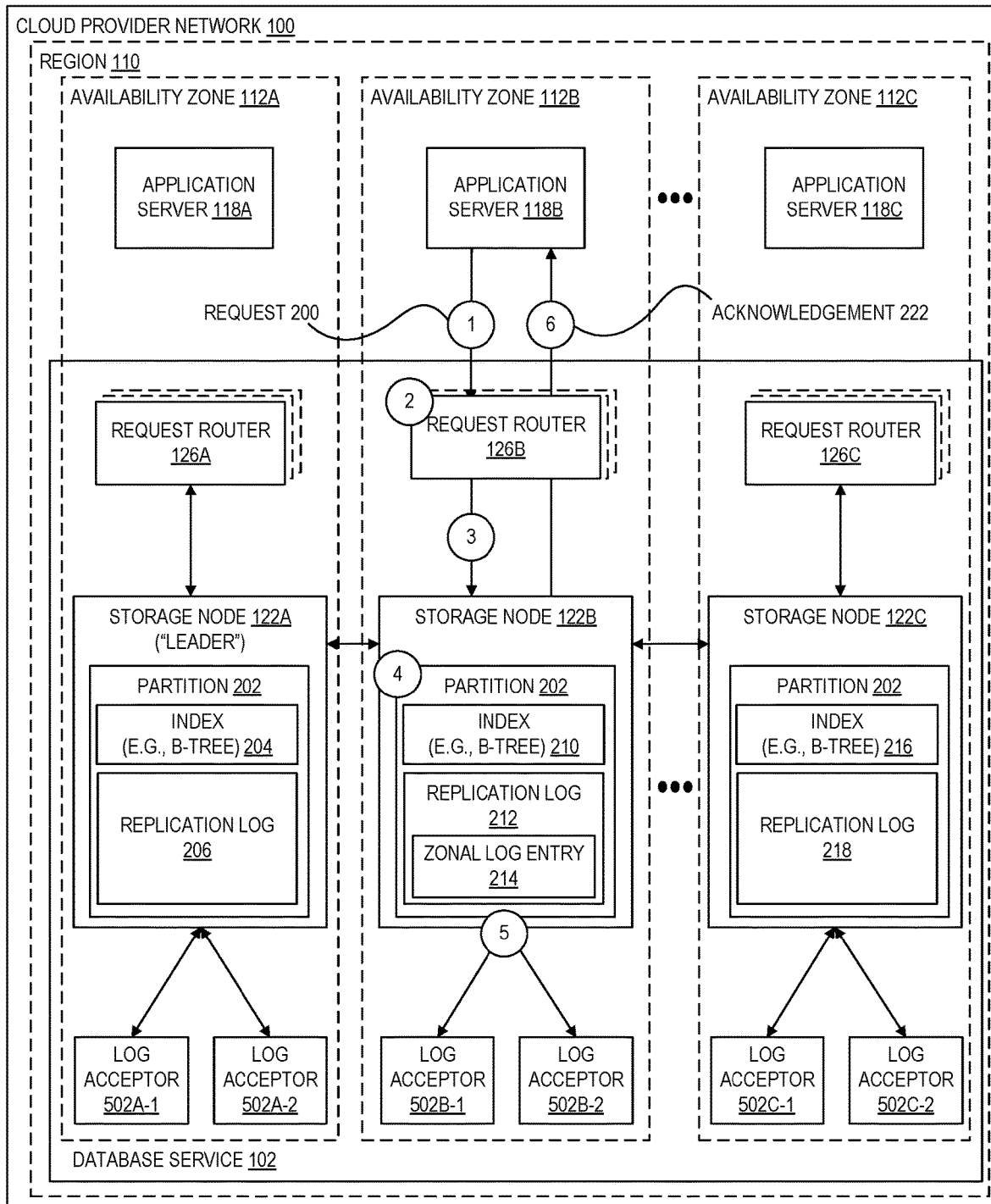
FIG. 5 is a diagram illustrating the use of log acceptors to durably store zonal log entries reflecting write operations specifying a zonal consistency model according to some embodiments.
Figure 6:
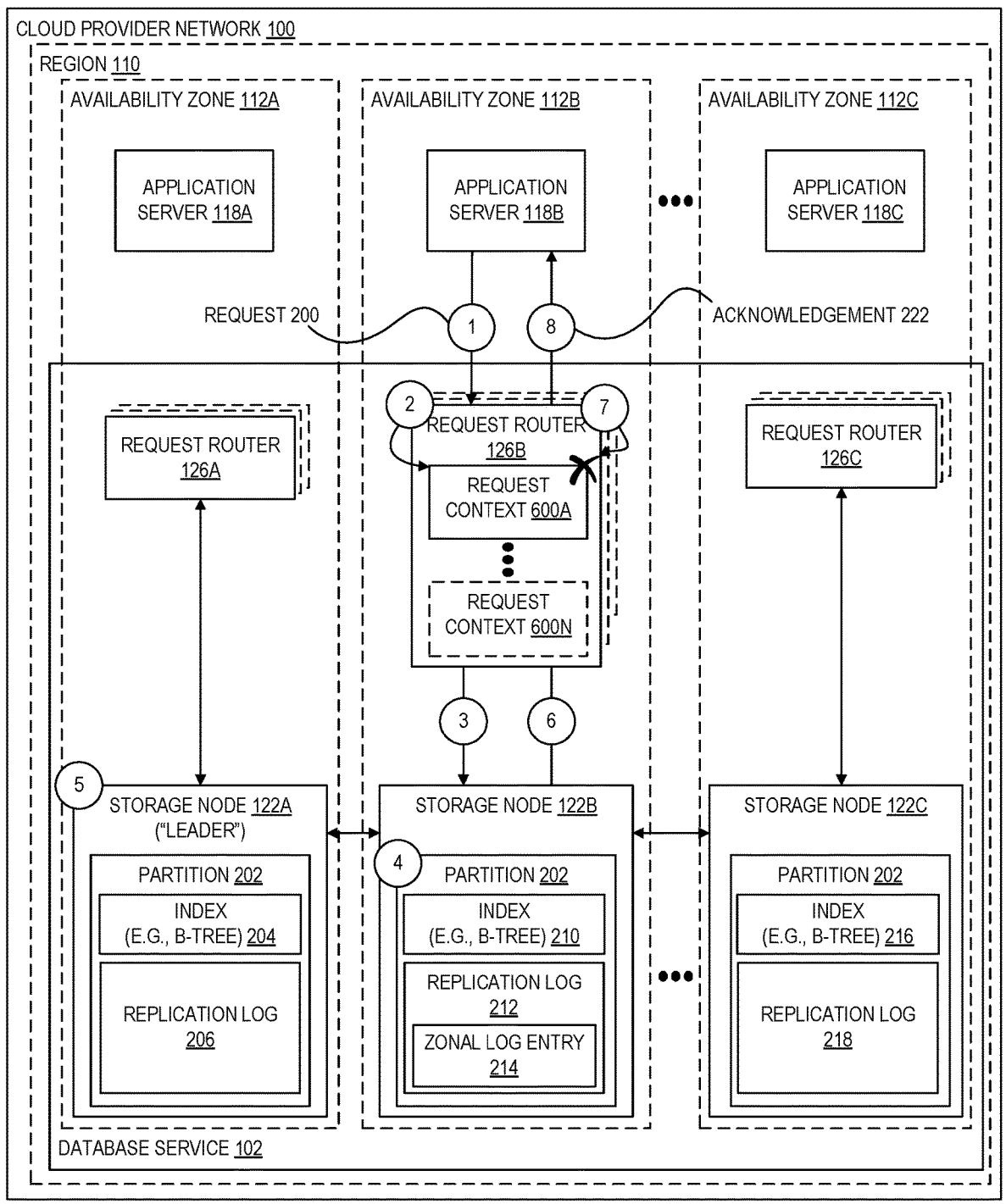
FIG. 6 is a diagram illustrating the use of request routers as witnesses to write operations specifying a zonal consistency model according to some embodiments.

In some embodiments, once the zonal log entry 214 is durably stored by the storage node 122B, the image of the data item in the item table is unlocked and marked as locally committed (FIG. 5 and FIG. 6 illustrate example mechanisms for durably storing a zonal log entry). In some embodiments, once the storage node 122B durably stores the zonal log entry 214, at circle "5," the storage node 122B sends an acknowledgment to the request router 126B indicating that the write operation has been accepted and successfully stored, which is then relayed to the originating application server 118B. In some embodiments, at circle "6," storage node 122B concurrently replicates the zonal log entry 214 to the leader storage node 122A for the partition 202, which resolves the write operation in accordance with timestamped-based replication rules (e.g., to resolve potential conflicts related to concurrent writes to a storage node 122C). In some embodiments, once the write operation is accepted or rejected by the leader storage node 122A, the leader storage node replicates the write operation among the storage nodes 122A using its standard consensus-based replication protocol.

Figure 3:
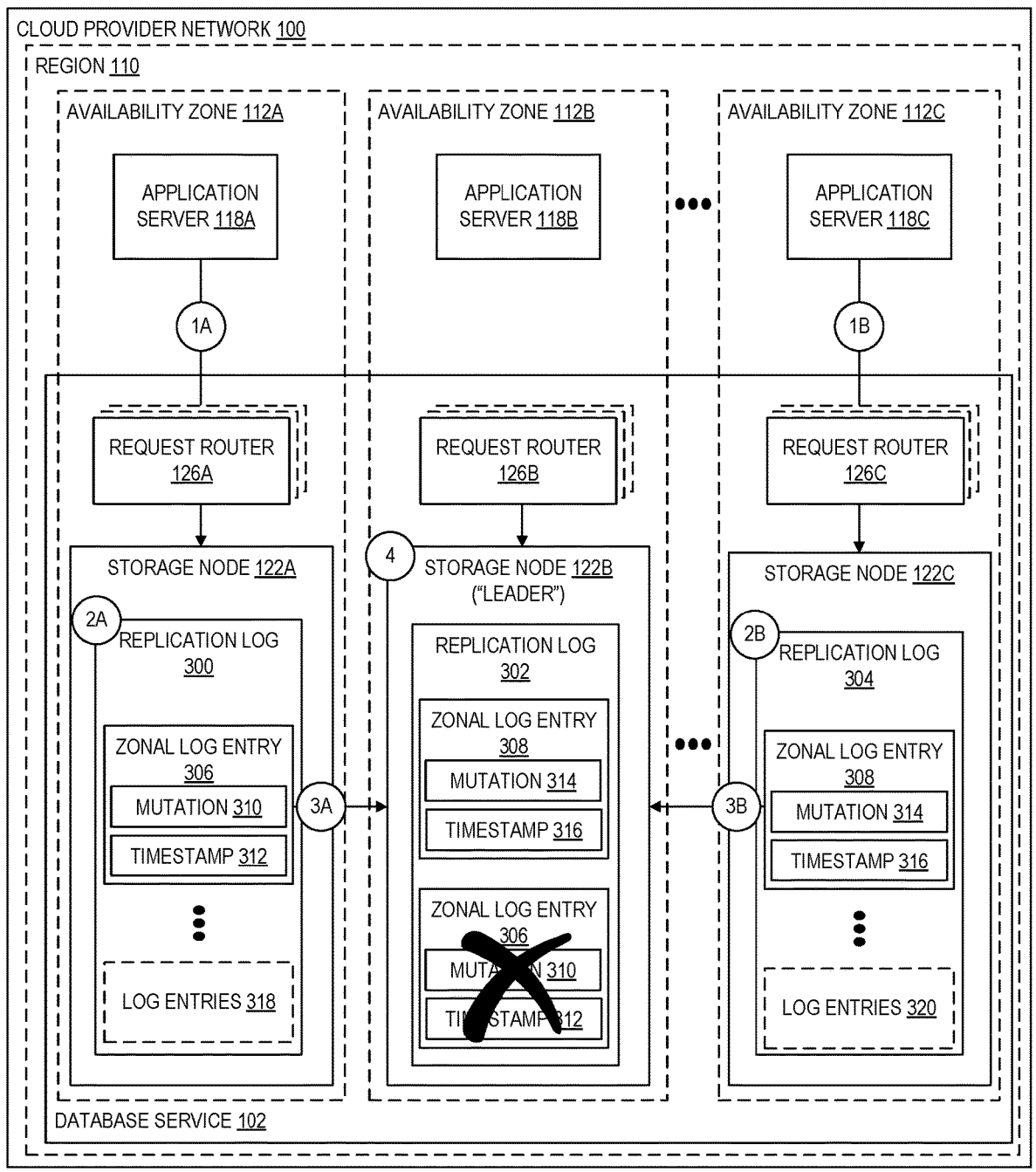
FIG. 3 is a diagram illustrating a database service resolving a write conflict among two or more write operations specifying a zonal consistency model according to some embodiments.

FIG. 3 is a diagram illustrating a database service resolving a write conflict among two or more write operations specifying a zonal consistency model according to some embodiments. In this example, at circle "1A," the application server 118A generates a request specifying a first write operation involving a data item (e.g., "data item A=1") and, at circle "1B," the application server 118C concurrently (e.g., near in time to the first request) generates a request specifying a second write operation involving the same data item (e.g., "data item A=2"), where both of the requests specify a zonal consistency model. In this example, the second request conflicts with the first request because the write operations request different changes to the same data item.

As described above in reference to FIG. 1, the request router 126A forwards the first request to the local storage node 122A and the request router 126C forwards the second request to the local storage node 122C. In some embodiments, at circle "2A," the storage node 122A generates a zonal log entry 306 as part of its replication log 300 (which may include other log entries 318), where the zonal log entry includes an indication of the mutation 310 (reflecting the requested write operation) and a timestamp 312. Similarly, at circle "2B," the storage node 122C generates a zonal log entry 308 as part of its replication log 304 (which may include other log entries 320), where the zonal log entry 308 includes a mutation 314 and timestamp 316.

In some embodiments, once each of storage nodes 122A and 122C has durably stored its zonal log entry, at circles "3A" and "3B," the storage nodes replicate the respective zonal log entries to the leader storage node 122B. In some embodiments, responsive to determining that a conflict exists, the storage node 122B reconciles the conflict between the first request generated by the application server 118A and the second request generated by the application server 118C based on the respective timestamps associated with the zonal log entries (e.g., timestamp 312 and timestamp 316). In some embodiments, the leader storage node 122B uses a "last writer wins" reconciliation method and selects the log entry with the latest timestamp as the "winner" between the conflicting operations. In some embodiments, once the winning zonal log entry is selected (e.g., zonal log entry 308 in the example of FIG. 1), the leader storage node 122B writes the log entry to its replication log 302 and replicates the log entry to storage nodes 122A and 122B using a consensus-based protocol (e.g., Paxos) and applies the operation specified by the mutation 314 to its index.

Figure 4:
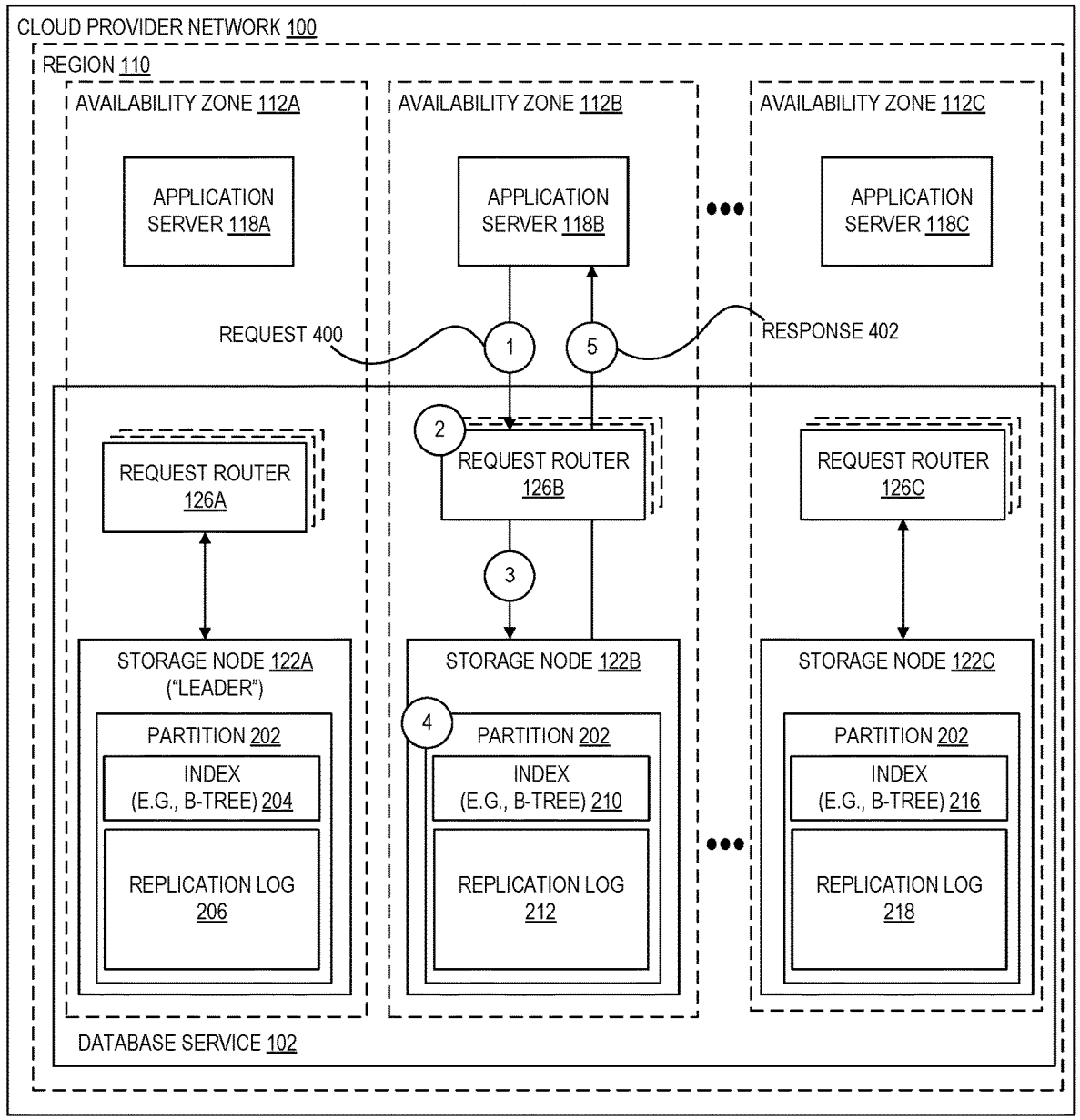
FIG. 4 is a diagram illustrating a database service processing a request specifying a read operation and further specifying a zonal consistency model according to some embodiments.

FIG. 4 is a diagram illustrating a database service processing a request specifying a read operation and further specifying a zonal consistency model according to some embodiments. For example, at circle "1" in FIG. 4 an application server 118B generates a request 400 to read (or "get") a data item stored in a partition 202 which is replicated across storage nodes 122A-122C. As indicated above, at circle "2," a request router 126B receiving the request 400 authenticates and authorizes the request, determines that the request involves a data item stored in the partition 202, and further determines that the request specifies a zonal consistency model. In some embodiments, responsive to determining that the request specifies a zonal consistency model, at circle "3," the request router 126B sends the request to the storage node 122B, which is located in the same availability zone 112B as the request router 126B and the originating application server 118B.

In some embodiments, at circle "4," a storage node 122B receiving a request specifying a read operation and further specifying a zonal consistency model reads the data item either from an item table (e.g., a last committed item image) or from the index 210 if the item is not found in the item table. In some embodiments, once the requested data item is obtained by the storage node 122B, at circle "5," a response 402 is sent back to the application server 118B (e.g., via the request router 126B) containing the requested data item.

As indicated above, for write operations specifying a zonal consistency model, a storage node sends an acknowledgment message back to the requesting client device once a zonal log entry is durably stored by the storage node. According to various embodiments, different mechanisms can be used to help ensure that zonal log entries are durably stored. FIG. 5 is a diagram illustrating the use of log acceptors to durably store zonal log entries reflecting write operations specifying a zonal consistency model according to some embodiments. For example, referring again to FIG. 2, the storage node 122B in availability zone 112B has received a write operation with zonal consistency mode, processed the write operation, and sent a confirmation response 222 back to the originating client device 118B. However, if the storage node 112B has written the zonal log entry 214 to only the replication log 212 at the storage node 122B, complications may arise if the storage node 122B experiences a failure before the write operation is further successfully propagated to the other peer storage nodes.

In FIG. 5, at least two log acceptors (e.g., processes running on separate computing devices) are used in each availability zone to better ensure durability of zonal log entries generated by storage nodes. For example, at circle "1" in FIG. 5 an application server 118B again generates a request 200 to perform a write operation involving a data item stored in a partition 202 which is replicated across storage nodes 122A-122C and, at circles "2" and "3," a request router 126B processes the request and forwards the request to the storage node 122B, which is located in the same availability zone 112B as the request router 126B and the originating application server 118B.

In some embodiments, at circle "4," the storage node 122B receiving a request specifying a write operation and further specifying a zonal consistency model, among other operations, generates and optionally stores a zonal log entry 214 that includes a tuple identifying the availability zone in which the storage node is located (e.g., availability zone 112B) and a local timestamp. In some embodiments, at circle "5," the storage node 122B also sends the zonal log entry 214 to each of log acceptors 502B-1 and 502B-2 in the availability zone 112B. The log acceptors each receive and store the zonal log entry locally and, once stored by a log acceptor, send a response confirming that the log entry is stored to the storage node 122B. Once the storage node 122B has received a confirmation message from both of the log acceptors, the storage node 122B sends an acknowledgment 222 to the request router 126B indicating that the write operation has been accepted and successfully stored, which is then relayed to the originating application server 118B at circle "6." In some embodiments, storage node 122B then concurrently replicates the zonal log entry 214 to the leader storage node 122A for the partition 202, which resolves the write operation in accordance with timestamped-based replication rules (e.g., to resolve potential conflicts related to concurrent writes to a storage node 122C). In some embodiments, once the write operation is accepted or rejected by the leader storage node 122A, the leader storage node replicates the write operation among the storage nodes 122A using its standard consensus-based replication protocol.

In some embodiments, instead of or in addition to log acceptors, request routers are used to "witness" write operations to help ensure that zonal log entries are durably stored. FIG. 6 is a diagram illustrating the use of request routers as witnesses to write operations specifying a zonal consistency model according to some embodiments. For example, at circle "1" in FIG. 6 an application server 118B again generates a request 200 to perform a write operation involving a data item stored in a partition 202 which is replicated across storage nodes 122A-122C and, at circle "2" a request router 126B processes the request in part by storing request context 600A. In some embodiments, the request context 600A includes information about the request 200 including, e.g., the type of operation, an identifier of the requesting device, etc. In some embodiments, at circle "3" the request router 126B forwards the request to the storage node 122B, which is located in the same availability zone 112B as the request router 126B and the originating application server 118B.

In some embodiments, at circle "4," the storage node 122B receiving a request specifying a write operation and further specifying a zonal consistency model, among other operations, generates and optionally stores a zonal log entry 214 that includes a tuple identifying the availability zone in which the storage node is located (e.g., availability zone 112B) and a local timestamp. In some embodiments, at circle "5," the storage node 122B then concurrently replicates the zonal log entry 214 to the leader storage node 122A for the partition 202 and the leader storage node replicates the write operation among the storage nodes 122A using its standard consensus-based replication protocol. In some embodiments, at circle "6," when the storage node 122B receives the replication message back from the storage node 122A (e.g., indicating that the zonal log entry 214 has been durably stored by the leader storage node 122A), the storage node 122B sends an acknowledgement message to the request router 126B. In some embodiments, at circle "7," responsive to receiving the acknowledgement message from the storage node 122B, the request router 126B deletes the request context 600A and, at circle "8," sends an acknowledgment 222 to the originating application server 118B. In some embodiments, if the request router 126B never receives the acknowledgment from the storage node 122B at circle "6" (e.g., because the storage node 122B experienced a failure), the request router 126B can replicate the request context 600A information to the leader storage node 122A so that the write is eventually persisted.

In the examples described above, the storage nodes storing a partition of a database table use a mixture of timestamp-based replication and consensus-based replication to store data items. In some embodiments, a user provides a request indicating that the user desires to use only timestamp-based replication for a regional table (e.g., and desires to forgo additional consensus-based replication mechanisms). In this example, the database service 102 uses only the timestamp-based replication mechanisms described herein to ensure eventual consistency among the data items stored in a table 114.

In some embodiments, a database service 102 further assists users desiring to use a zonal consistency model by automatically migrating table replicas to availability zones from which a majority of the table's requests originate. For example, based on analysis of log information (e.g., obtained from a logging or monitoring service of the cloud provider network 100), the database service 102 may determine that a majority of the requests involving a table originate from client devices located in availability zones A, D, and F, while the tables regional replicas currently are present in availability zones A, B, and C. In this example, the database service 102 may automatically migrate the replicas stored at storage nodes in availability zones B and C to availability zones D and F, respectively. In this manner, zonal consistency model operations can efficiently access replicas in local availability zones, thereby improving latency of the application using the table.

Figure 7:
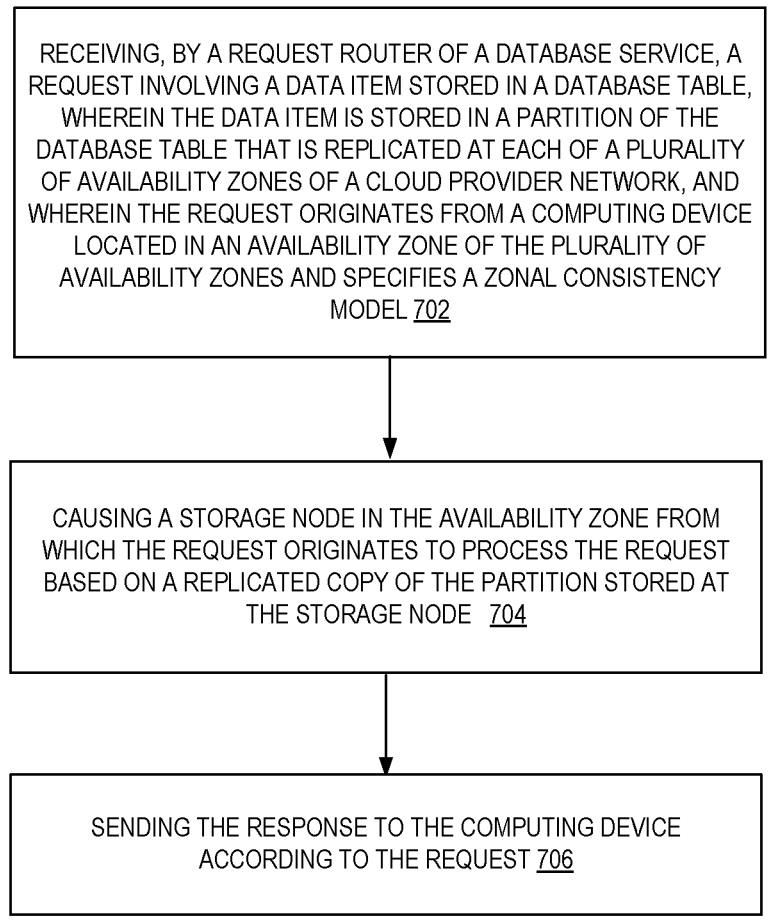
FIG. 7 is a flow diagram illustrating operations of a method for enabling a database service to provide a zonal consistency model for read and write operations associated with database tables replicated across a plurality of availability zones of a cloud provider network according to some embodiments.

FIG. 7 is a flow diagram illustrating operations 700 of a method for enabling a database service to provide a zonal consistency model for read and write operations associated with database tables replicated across a plurality of availability zones of a cloud provider network according to some embodiments. Some or all of the operations 700 (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations 700 are performed by various components of a database service 102 of the other figures.

The operations 700 include, at block 702, receiving, by a request router of a database service, a request involving a data item stored in a database table, wherein the data item is stored in a partition of the database table that is replicated at each of a plurality of availability zones of a cloud provider network, and wherein the request originates from a computing device located in an availability zone of the plurality of availability zones and specifies a zonal consistency model;

The operations 700 further include, at block 704, causing a storage node in the availability zone from which the request originates to process the request based on a replicated copy of the partition stored at the storage node.

The operations 700 further include, at block 706, sending the response to the computing device according to the request.

Figure 8:
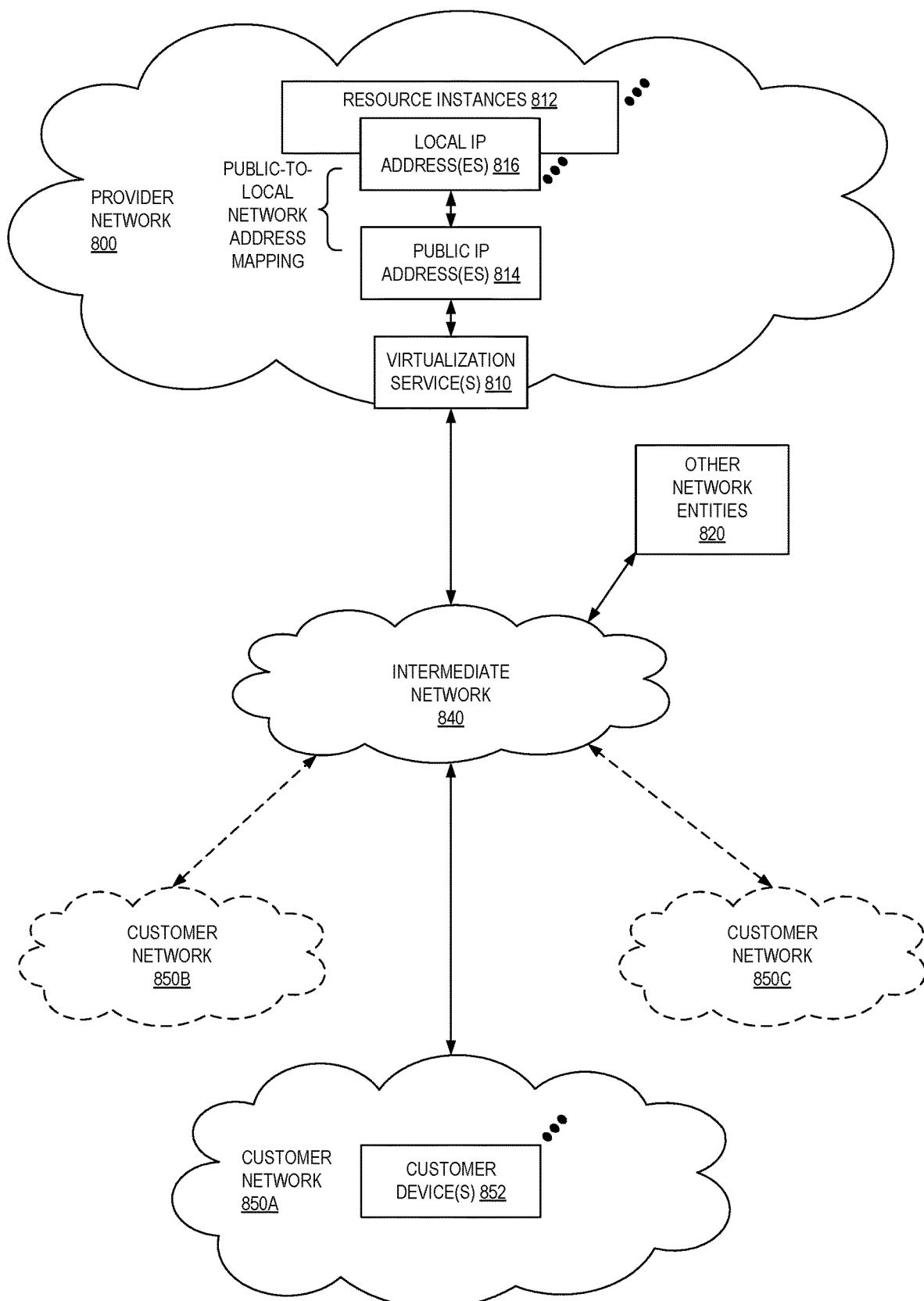
FIG. 8 illustrates an example provider network environment according to some embodiments.

FIG. 8 illustrates an example provider network (or "service provider system") environment according to some embodiments. A provider network 800 may provide resource virtualization to customers via one or more virtualization services 810 that allow customers to purchase, rent, or otherwise obtain instances 812 of virtualized resources, including but not limited to computation and storage resources, implemented on devices within the provider network or networks in one or more data centers. Local Internet Protocol (IP) addresses 816 may be associated with the resource instances 812; the local IP addresses are the internal network addresses of the resource instances 812 on the provider network 800. In some embodiments, the provider network 800 may also provide public IP addresses 814 and/or public IP address ranges (e.g., Internet Protocol version 4 (IPv4) or Internet Protocol version 6 (IPv6) addresses) that customers may obtain from the provider 800.

Conventionally, the provider network 800, via the virtualization services 810, may allow a customer of the service provider (e.g., a customer that operates one or more client networks 850A-850C including one or more customer device(s) 852) to dynamically associate at least some public IP addresses 814 assigned or allocated to the customer with particular resource instances 812 assigned to the customer. The provider network 800 may also allow the customer to remap a public IP address 814, previously mapped to one virtualized computing resource instance 812 allocated to the customer, to another virtualized computing resource instance 812 that is also allocated to the customer. Using the virtualized computing resource instances 812 and public IP addresses 814 provided by the service provider, a customer of the service provider such as the operator of customer network(s) 850A-850C may, for example, implement customer-specific applications and present the customer's applications on an intermediate network 840, such as the Internet. Other network entities 820 on the intermediate network 840 may then generate traffic to a destination public IP address 814 published by the customer network(s) 850A-850C; the traffic is routed to the service provider data center, and at the data center is routed, via a network substrate, to the local IP address 816 of the virtualized computing resource instance 812 currently mapped to the destination public IP address 814. Similarly, response traffic from the virtualized computing resource instance 812 may be routed via the network substrate back onto the intermediate network 840 to the source entity 820.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193 and may be mutable within the provider network. Network traffic originating outside the provider network is not directly routed to local IP addresses; instead, the traffic uses public IP addresses that are mapped to the local IP addresses of the resource instances. The provider network may include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses may be assigned by the provider network infrastructure to particular resource instances; these public IP addresses may be referred to as standard public IP addresses, or simply standard IP addresses. In some embodiments, the mapping of a standard IP address to a local IP address of a resource instance is the default launch configuration for all resource instance types.

At least some public IP addresses may be allocated to or obtained by customers of the provider network 800; a customer may then assign their allocated public IP addresses to particular resource instances allocated to the customer. These public IP addresses may be referred to as customer public IP addresses, or simply customer IP addresses. Instead of being assigned by the provider network 800 to resource instances as in the case of standard IP addresses, customer IP addresses may be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 9:
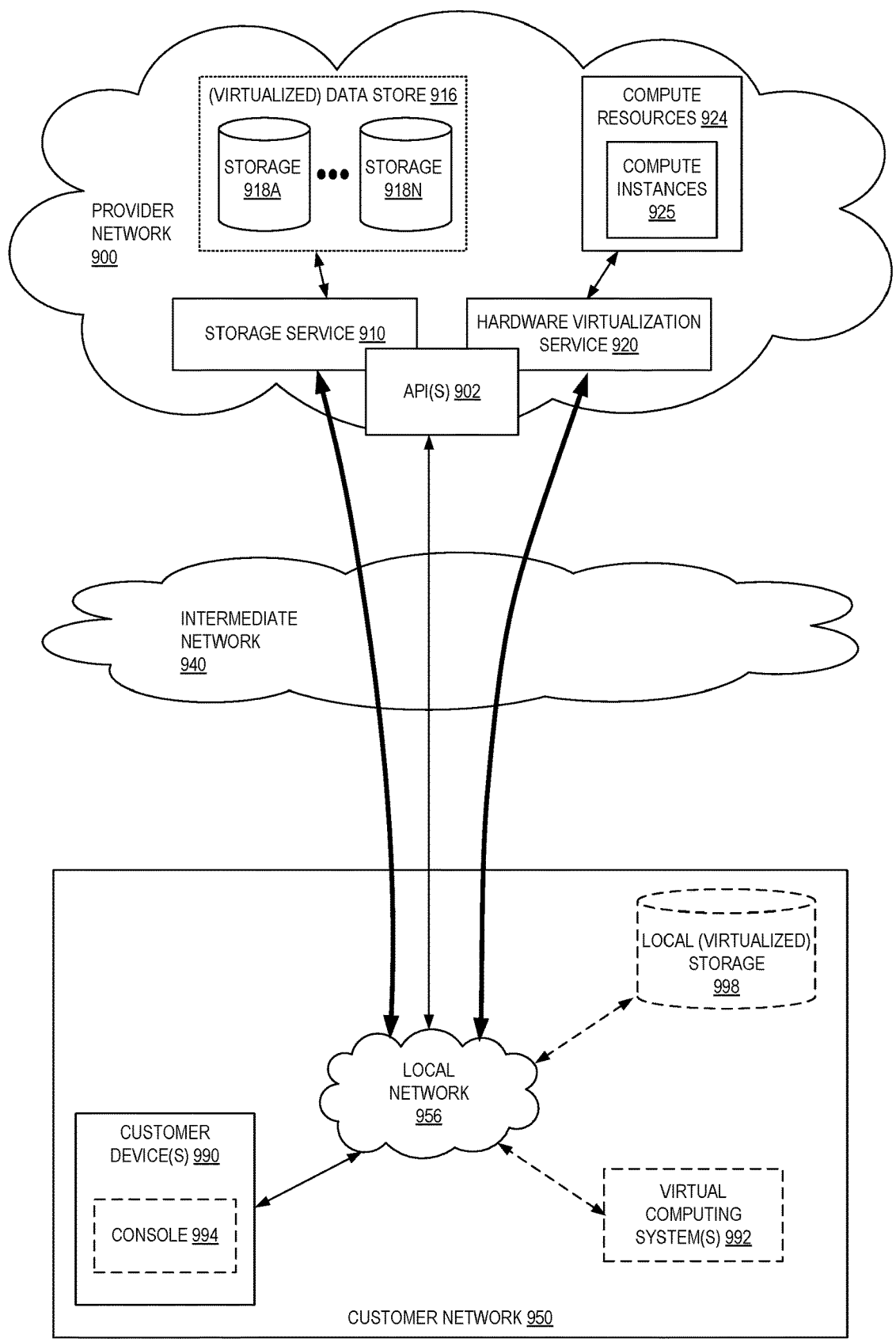
FIG. 9 is a block diagram of an example provider network that provides a storage service and a hardware virtualization service to customers according to some embodiments.

FIG. 9 is a block diagram of an example provider network that provides a storage service and a hardware virtualization service to customers, according to some embodiments. Hardware virtualization service 920 provides multiple compute resources 924 (e.g., compute instances 925 such as VMs) to customers. The compute resources 924 may, for example, be rented or leased to customers of the provider network 900 (e.g., to a customer that implements customer network 950). Each computation resource 924 may be provided with one or more local IP addresses. Provider network 900 may be configured to route packets from the local IP addresses of the compute resources 924 to public Internet destinations, and from public Internet sources to the local IP addresses of compute resources 924.

Provider network 900 may provide a customer network 950, for example coupled to intermediate network 940 via local network 956, the ability to implement virtual computing systems 992 via hardware virtualization service 920 coupled to intermediate network 940 and to provider network 900. In some embodiments, hardware virtualization service 920 may provide one or more APIs 902, for example a web services interface, via which a customer network 950 may access functionality provided by the hardware virtualization service 920, for example via a console 994 (e.g., a web-based application, standalone application, mobile application, etc.). In some embodiments, at the provider network 900, each virtual computing system 992 at customer network 950 may correspond to a computation resource 924 that is leased, rented, or otherwise provided to customer network 950.

From an instance of a virtual computing system 992 and/or another customer device 990 (e.g., via console 994), the customer may access the functionality of storage service 910, for example via one or more APIs 902, to access data from and store data to storage resources 918A-918N of a virtual data store 916 (e.g., a folder or "bucket", a virtualized volume, a database, etc.) provided by the provider network 900. In some embodiments, a virtualized data store gateway (not shown) may be provided at the customer network 950 that may locally cache at least some data, for example frequently-accessed or critical data, and that may communicate with storage service 910 via one or more communications channels to upload new or modified data from a local cache so that the primary store of data (virtualized data store 916) is maintained. In some embodiments, a user, via a virtual computing system 992 and/or on another customer device 990, may mount and access virtual data store 916 volumes via storage service 910 acting as a storage virtualization service, and these volumes may appear to the user as local (virtualized) storage 998.

While not shown in FIG. 9, the virtualization service(s) may also be accessed from resource instances within the provider network 900 via API(s) 902. For example, a customer, appliance service provider, or other entity may access a virtualization service from within a respective virtual network on the provider network 900 via an API 902 to request allocation of one or more resource instances within the virtual network or within another virtual network.

Figure 10:
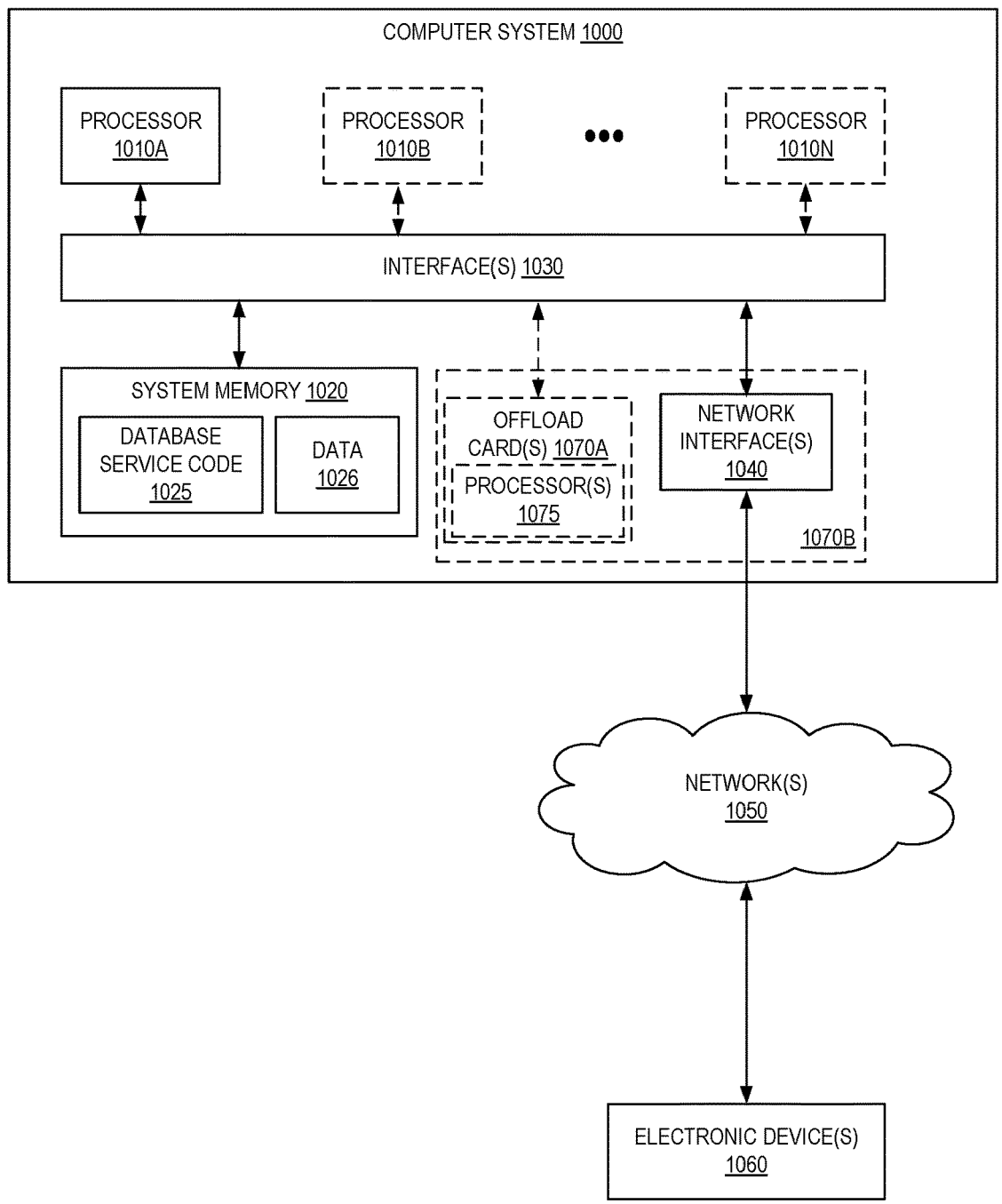
FIG. 10 is a block diagram illustrating an example computer system that may be used in some embodiments.

In some embodiments, a system that implements a portion or all of the techniques described herein may include a general-purpose computer system that includes or is configured to access one or more computer-accessible media, such as computer system 1000 illustrated in FIG. 10. In the illustrated embodiment, computer system 1000 includes one or more processors 1010 coupled to a system memory 1020 via an input/output (I/O) interface 1030. Computer system 1000 further includes a network interface 1040 coupled to I/O interface 1030. While FIG. 10 shows computer system 1000 as a single computing device, in various embodiments a computer system 1000 may include one computing device or any number of computing devices configured to work together as a single computer system 1000.

In various embodiments, computer system 1000 may be a uniprocessor system including one processor 1010, or a multiprocessor system including several processors 1010 (e.g., two, four, eight, or another suitable number). Processors 1010 may be any suitable processors capable of executing instructions. For example, in various embodiments, processors 1010 may be general-purpose or embedded processors implementing any of a variety of instruction set architectures (ISAs), such as the x86, ARM, PowerPC, SPARC, or MIPS ISAs, or any other suitable ISA. In multiprocessor systems, each of processors 1010 may commonly, but not necessarily, implement the same ISA.

System memory 1020 may store instructions and data accessible by processor(s) 1010. In various embodiments, system memory 1020 may be implemented using any suitable memory technology, such as random-access memory (RAM), static RAM (SRAM), synchronous dynamic RAM (SDRAM), nonvolatile/Flash-type memory, or any other type of memory. In the illustrated embodiment, program instructions and data implementing one or more desired functions, such as those methods, techniques, and data described above are shown stored within system memory 1020 as database service code 1025 (e.g., executable to implement, in whole or in part, the database service 102 or components thereof) and data 1026.

In one embodiment, I/O interface 1030 may be configured to coordinate I/O traffic between processor 1010, system memory 1020, and any peripheral devices in the device, including network interface 1040 or other peripheral interfaces. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. Also, in some embodiments some or all of the functionality of I/O interface 1030, such as an interface to system memory 1020, may be incorporated directly into processor 1010.

Network interface 1040 may be configured to allow data to be exchanged between computer system 1000 and other devices 1060 attached to a network or networks 1050, such as other computer systems or devices as illustrated in FIG. 1, for example. In various embodiments, network interface 1040 may support communication via any suitable wired or wireless general data networks, such as types of Ethernet network, for example. Additionally, network interface 1040 may support communication via telecommunications/telephony networks such as analog voice networks or digital fiber communications networks, via storage area networks (SANs) such as Fibre Channel SANs, or via I/O any other suitable type of network and/or protocol.

In some embodiments, a computer system 1000 includes one or more offload cards 1070A or 1070B (including one or more processors 1075, and possibly including the one or more network interfaces 1040) that are connected using an I/O interface 1030 (e.g., a bus implementing a version of the Peripheral Component Interconnect-Express (PCI-E) standard, or another interconnect such as a QuickPath interconnect (QPI) or UltraPath interconnect (UPI)). For example, in some embodiments the computer system 1000 may act as a host electronic device (e.g., operating as part of a hardware virtualization service) that hosts compute resources such as compute instances, and the one or more offload cards 1070A or 1070B execute a virtualization manager that can manage compute instances that execute on the host electronic device. As an example, in some embodiments the offload card(s) 1070A or 1070B can perform compute instance management operations such as pausing and/or un-pausing compute instances, launching and/or terminating compute instances, performing memory transfer/copying operations, etc. These management operations may, in some embodiments, be performed by the offload card(s) 1070A or 1070B in coordination with a hypervisor (e.g., upon a request from a hypervisor) that is executed by the other processors 1010A-1010N of the computer system 1000. However, in some embodiments the virtualization manager implemented by the offload card(s) 1070A or 1070B can accommodate requests from other entities (e.g., from compute instances themselves), and may not coordinate with (or service) any separate hypervisor.

In some embodiments, system memory 1020 may be one embodiment of a computer-accessible medium configured to store program instructions and data as described above. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 1000 via I/O interface 1030. A non-transitory computer-accessible storage medium may also include any volatile or non-volatile media such as RAM (e.g., SDRAM, double data rate (DDR) SDRAM, SRAM, etc.), read only memory (ROM), etc., that may be included in some embodiments of computer system 1000 as system memory 1020 or another type of memory. Further, a computer-accessible medium may include transmission media or signals such as electrical, electromagnetic, or digital signals, conveyed via a communication medium such as a network and/or a wireless link, such as may be implemented via network interface 1040.

Various embodiments discussed or suggested herein can be implemented in a wide variety of operating environments, which in some cases can include one or more user computers, computing devices, or processing devices which can be used to operate any of a number of applications. User or client devices can include any of a number of general-purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and/or other devices capable of communicating via a network.

Most embodiments utilize at least one network that would be familiar to those skilled in the art for supporting communications using any of a variety of widely-available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In embodiments utilizing a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, PHP, or TCL, as well as combinations thereof. The server(s) may also include database servers, including without limitation those commercially available from Oracle®, Microsoft®, Sybase®, IBM®, etc. The database servers may be relational or non-relational (e.g., "NoSQL"), distributed or non-distributed, etc.

Environments disclosed herein can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system may also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

In the preceding description, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Bracketed text and blocks with dashed borders (e.g., large dashes, small dashes, dot-dash, and dots) are used herein to illustrate optional operations that add additional features to some embodiments. However, such notation should not be taken to mean that these are the only options or optional operations, and/or that blocks with solid borders are not optional in certain embodiments.

Reference numerals with suffix letters (e.g., 918A-918N) may be used to indicate that there can be one or multiple instances of the referenced entity in various embodiments, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters may or may not have the same number of instances in various embodiments.

References to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Moreover, in the various embodiments described above, unless specifically noted otherwise, disjunctive language such as the phrase "at least one of A, B, or C" is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. A computer-implemented method comprising:
   receiving, by a request router of a database service, a request to perform a write operation involving a data item stored in a partition of a database table, wherein the partition is replicated at each of a plurality of storage nodes in a respective plurality of availability zones of a cloud provider network, and wherein the request originates from a computing device located in a first availability zone of the plurality of availability zones;
   determining that the request specifies a zonal consistency model for the request;
   determining, based on the request specifying a zonal consistency model for the request, to send the request to a first storage node of the plurality of storage nodes located in the first availability zone;
   sending the request to the first storage node located in the first availability zone, wherein the first storage node stores a replicated copy of the partition;
   generating, by the first storage node, a log entry reflecting the write operation and including a timestamp;
   sending, by the first storage node, the log entry to a second storage node of the plurality of storage nodes in a second availability zone of the plurality of availability zones, wherein the second storage node is an elected leader of the plurality of storage nodes based on a leader election protocol;
   propagating, by the second storage node, the log entry to the plurality of storage nodes using a consensus protocol; and sending a response to the computing device indicating that the request was successfully processed.

2. The computer-implemented method of claim 1, wherein the request is a first request to perform a first write operation, the request router is a first request router, and the log entry is a first log entry including a first timestamp, and wherein the method further comprises:

receiving, by a second request router located in the second availability zone, a second request to perform a second write operation involving the data item, wherein the second write operation conflicts with the first write operation;

sending the second request to the second storage node in the second availability zone;

generating, by the second storage node in the second availability zone, a second log entry reflecting the second write operation and including a second timestamp;

reconciling, by a third storage node of the plurality of storage nodes in a third availability zone of the plurality of availability zones, the conflict between the first write operation and the second write operation in favor of the first write operation based on a comparison of the first timestamp and the second timestamp; and propagating the first log entry reflecting the first write operation to the plurality of storage nodes using a consensus protocol.

3. A computer-implemented method comprising:

receiving, by a request router of a database service, a request to perform a write operation involving a data item stored in a database table, wherein the data item is stored in a partition of the database table that is replicated at a plurality of storage nodes in a respective plurality of availability zones of a cloud provider network, and wherein the request originates from a computing device located in a first availability zone of the plurality of availability zones and specifies a zonal consistency model;

determining, based on the request specifying a zonal consistency model, to send the request to a first storage node of the plurality of storage nodes, wherein the first storage node is located in the first availability zone;

causing the first storage node located in the first availability zone to process the request using a replicated copy of the partition stored at the first storage node;

generating, by the first storage node in the first availability zone, a log entry reflecting the write operation and including a timestamp;

sending, by the first storage node, the log entry to a second storage node of the plurality of storage nodes in a second availability zone of the plurality of availability zones, wherein the second storage node is an elected leader of the plurality of storage nodes based on a leader election protocol;

propagating, by the second storage node, the log entry to the plurality of storage nodes using a consensus protocol; and sending a response to the computing device according to the request.

4. The computer-implemented method of claim 3, wherein the request is a first request to perform a first write operation, the request router is a first request router, and the log entry is a first log entry including a first timestamp, and wherein the method further comprises:

receiving, by a second request router located in the second availability zone a second request to perform a second write operation involving the data item, wherein the second write operation conflicts with the first write operation;

sending the second request to the second storage node in the second availability zone;

generating, by the second storage node in the second availability zone, a second log entry reflecting the second write operation and including a second timestamp;

reconciling, by a third request router in a third availability zone of the plurality of availability zones, the conflict between the first write operation and the second write operation in favor of the first write operation based on a comparison of the first timestamp and the second timestamp; and propagating the first log entry reflecting the first write operation to the plurality of storage nodes using a consensus protocol.

5. The computer-implemented method of claim 3, further comprising receiving a request to read another data item stored in the database table, and wherein the first storage node obtains the another data item using an index managed by the first storage node.

6. The computer-implemented method of claim 3, further comprising:

sending, by the first storage node, the log entry to each of two logging servers;

receiving responses from each of the two logging servers indicating that the log entry has been stored by each of the two logging servers; and sending a response to the computing device indicating that the write operation is successful.

7. The computer-implemented method of claim 3, wherein the plurality of availability zones is a first plurality of availability zones, wherein the computing device is part of a clustered application including application instances in each of a second plurality of availability zones, and wherein the method further comprises:

determining that requests received from the clustered application originate in each of the second plurality of availability zones; and migrating replicated copies of the partition to storage nodes located in the second plurality of availability zones.

8. The computer-implemented method of claim 3, further comprising determining, by the request router, the first availability zone based on an identifier of the first availability zone included in the request.

9. The computer-implemented method of claim 3, wherein the log entry is stored in one of: a replication log used by storage nodes in the plurality of availability zones to replicate the database table using a consensus-based replication protocol, or a separate zonal log.

10. The computer-implemented method of claim 3, further comprising causing the first storage node to generate a zonal log entry that identifies the first availability zone in which the first storage node is located and to send the zonal log entry to one or more log acceptors in the first availability zone in which the first storage node is located.

11. A system comprising:

a first one or more electronic devices to implement a request router of a database service in a cloud provider network, the request router including instructions that upon execution cause the request router to:

receive a request to perform a write operation involving a data item stored in a partition of a database table, wherein the partition is replicated at storage nodes in each of a plurality of availability zones of the cloud provider network, and wherein the request originates from a computing device located in a first availability zone of the plurality of availability zones, determine that the request specifies a zonal consistency model for the request, determine, based on the request specifying a zonal consistency model for the request, to send the request to a first storage node of the storage nodes, wherein the first storage node is located in the first availability zone, and send the request to the first storage node located in the first availability zone, wherein the first storage node stores a replicated copy of the partition; and a second one or more electronic devices to implement the first storage node in the first availability zone of the cloud provider network, the first storage node including instructions that upon execution cause the first storage node to:

process the request using a replicated copy of the partition stored at the first storage node;

generate a log entry reflecting the write operation and including a timestamp, send the log entry to a second storage node of the storage nodes in a second availability zone of the plurality of availability zones, wherein the second storage node is an elected leader of the storage nodes based on a leader election protocol, cause the second storage node to propagate the log entry to the storage nodes using a consensus protocol, and send a response to the computing device indicating that the request was successfully processed.

12. The system of claim 11, wherein the request is a first request, the request router is a first request router, and the log entry is a first log entry, and wherein the system further comprises:

a third one or more electronic devices to implement a second request router located in the second availability zone, the second request router including instructions that upon execution cause the second request router to:

receive a second request to perform a write operation involving the data item, wherein the second request conflicts with the first request;

send the second request to the second storage node in the second availability zone; and cause the second storage node in the second availability zone to generate a second log entry reflecting the write operation and including a second timestamp; and a fourth one or more electronic devices to implement a third request router located in a third availability zone of the plurality of availability zones of the cloud provider network, the third request router including instructions that upon execution cause the third request router to:

reconcile the conflict between the first request and the second request in favor of the first request based on the first timestamp and the second timestamp; and propagate the first log entry reflecting the first write operation to the storage nodes.

13. The system of claim 11, wherein the first storage node further includes instructions that upon execution cause the first storage node to:

send the log entry to each of two logging servers;

receive responses from each of the two logging servers indicating that the log entry has been stored by each of the two logging servers; and send a response indicating that the write operation is successful.

14. The system of claim 11, wherein the request router further includes instructions that upon execution cause the request router to cause the storage node to generate a zonal log entry that identifies the first availability zone in which the storage node is located and to send the zonal log entry to one or more log acceptors in the first availability zone in which the storage node is located.

\* \* \* \* \*